F. D. NEWBURY.
Revolver.
No. 278. A. I. Patented May 1, 1860.
5
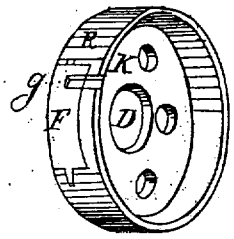
4
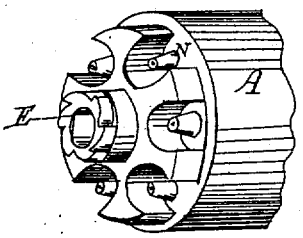
7
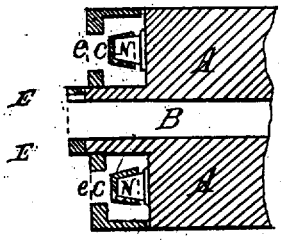
6
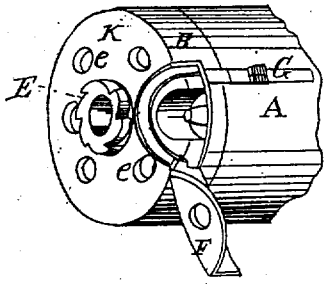
Witnesses
Patrick Delaney
A. V. De Witt
Signed
F. D. Newbury
N. PETERS, PHOTO-LITHOGRAPHER, WASHINGTON, D. C.

UNITED STATES PATENT OFFICE.

FREDERICK D. NEWBURY, OF ALBANY, NEW YORK.

IMPROVEMENT IN REVOLVING FIRE-ARMS.

Specification forming part of Letters Patent No. 13,029, dated June 12, 1855; Additional Improvement No. 278, dated May 1, 1860.

*To all whom it may concern:*

Be it known that I, FREDERICK D. NEWBURY, of the city of Albany, State of New York, have invented certain Improvements upon the Priming-Cap Guard, for which Letters Patent of the United States were issued to me on the 12th day of June, A. D. 1855; and I declare the following specification, with the drawings hereto appended as part of the same, to be a full and perfect description thereof.

The guard when constructed as described in the specification of the above-mentioned original patent could only be employed with revolvers whose cylinders were arranged for removal on every occasion of loading and capping. This form of construction can only be applied conveniently to the smaller class of arms, such as pocket and belt pistols; but with army and navy pistols, rifles, and pieces of that class the framing for the detaching apparatus would need to be too cumbrous to admit of the removal of the cylinder for capping, and this circumstance makes it necessary to arrange the guard so as to admit of the capping and the removal of the exploded caps from the rear of the cylinder, as is now done. This is the object of the present improvement.

The drawings represent the cap as applied to the cylinder of a Colt's revolver of the kind now used in the army and navy of the United States. The numbering of the figures is continued from that of the original patent.

Figure 4 represents the rear end of a cylinder, in perspective, fitted for the guard; Fig. 5, the guard, as seen looking into it in perspective; Fig. 6, the cylinder covered with the guard; Fig. 7, a longitudinal central section of Fig. 4.

Similar letters in all the figures represent the same parts of the apparatus, and conform as far as possible to those of the drawings of the original patent.

In the original specification, to which this is intended to be additional, the guard is described as arranged to serve a cylinder whose cones project out from a flat surface, and therefore the cap chambers or recesses are made, as shown in Fig. 1, within the body of the guard; but since in the Colt's cylinder, Fig. 4, these chambers are formed within the end of the cylinder, the guard must be formed differently to meet this change of construction. To effect this the guard is formed of a thin ring of metal, R, of equal diameter with the cylinder A, and a fraction wider or deeper than the height of the cones with the caps upon them, (see Fig. 7,) and it slides over the end of the cylinder to a range with the bottom of the cone-cells, or thereabout, the cylinder being turned down for that purpose. Its end is closed with a disk of metal, K, through an opening, in which D, the projecting end of the cylinder or ratchet-wheel E, protrudes. To have access to the cones for capping and removing the fragments of exploded caps, an opening is cut out from the end and side of the guard, uncovering a cap-cell, so as to give free admission to it, covered by a door, F, fitted, when shut, to lie level and coincident with the surface of the guard, and when open to offer no impediment to the operation of capping. This is shown distinctly in the drawings, Fig. 6. The door is shown as shut in Fig. 5. To hold the door shut, and to connect it with the cylinder so as to move with it in its revolutions, a flush-bolt, G, is dovetailed into the cylinder, having a corresponding groove sunk into the door at *g*, Fig. 5. The end of the guard is pierced with openings *e* a little larger than the ends of the percussion-caps *c c*, Fig. 7, for the entrance of the point of the hammer to explode the cap.

In the application of the above-described guard to cylinders having cones projecting from flat surfaces, as described in the original patent, it would be necessary to surround the cones with cells after the manner of Colt's cylinder, which is part of my design.

In the above description the words "cylinder" and "ring" are used in reference to the present form of load-holder and the adaptation of the guard to it. In any variation of its form—as, for example, a fluted cylinder—the guard is to be made to conform to its shape and the most practicable mode of adapting it to the purposes intended to be effected, as explained in the above description.

The management of the guard is thus: To cap the piece slide bolt G back and drop the door F. This permits the cylinder to revolve independently of the guard. Then turn the cylinder, exposing each cone in succession, and cap it. Then shut and bolt the door, by which the cylinder and guard become secured to each other, with every cap opposite an opening, *e*, exposed to the stroke of the hammer. When struck its fragments cannot escape from its cell until taken out at the door preparatory to recapping the cones.

In the original specification the depth of the guard is described as being only so deep as to allow the cap to project beyond its outer (rear) face, so as to permit the hammer to explode the cap with certainty. It is found to be better to keep the cap itself entirely within the guard, and let the face or point of the hammer pass through to the cap.

What I claim as an improvement additional to the devices of the invention described in the original patent of June 12, 1855, is—

The application to cylinders having their cones placed within cells, or to cylinders so fitted as to require their being capped from the rear, of a guard constructed of a ring of metal closed at its end by a disk having appropriate openings for the access of the hammer to each cone, and with a door giving access to the cone-cells, the guard being fitted to move independently of the cylinder or in connection with it, as required, substantially in the manner and for the purposes set forth in the above specification.

F. D. NEWBURY.

Witnesses:
A. V. De Witt,
Richd. Varick De Witt.